United States Patent
Cui et al.

(10) Patent No.: US 11,518,050 B2
(45) Date of Patent: Dec. 6, 2022

(54) ROBOT

(71) Applicants: CLOUDMINDS (BEIJING) TECHNOLOGIES CO., LTD., Beijing (CN); INNFOS DRIVE (BEIJING) TECHNOLOGIES CO., LTD., Beijing (CN)

(72) Inventors: Haotian Cui, Beijing (CN); Cheng Luo, Guangxi (CN)

(73) Assignee: CLOUDMINDS ROBOTICS CO., LTD., Shanghai (CN)

(*) Notice: Subject to any disclaimer, the term of this patent is extended or adjusted under 35 U.S.C. 154(b) by 0 days.

(21) Appl. No.: 16/844,859

(22) Filed: Apr. 9, 2020

(65) Prior Publication Data
US 2020/0331153 A1   Oct. 22, 2020

(30) Foreign Application Priority Data

Apr. 9, 2019 (CN) .......................... 201920476761.2

(51) Int. Cl.
  *B25J 17/00* (2006.01)
  *B25J 17/02* (2006.01)
  *B25J 18/00* (2006.01)
  *B25J 19/00* (2006.01)

(52) U.S. Cl.
  CPC ......... *B25J 19/007* (2013.01); *B25J 19/0029* (2013.01)

(58) Field of Classification Search
  CPC .. B25J 19/007; B25J 19/0029; B25J 19/0025; B25J 9/0006; B25J 9/0087; B25J 17/0258; B25J 17/025
  See application file for complete search history.

(56) References Cited

U.S. PATENT DOCUMENTS

| | | | | |
|---|---|---|---|---|
| 6,463,356 | B1* | 10/2002 | Hattori | B62D 57/032 700/245 |
| 2012/0176007 | A1* | 7/2012 | Takeuchi | H02K 7/116 310/68 B |
| 2017/0036346 | A1* | 2/2017 | Kamioka | B62D 57/032 |

FOREIGN PATENT DOCUMENTS

| | | |
|---|---|---|
| JP | 2004303842 A | 10/2004 |
| JP | 5001800 B2 | 8/2012 |
| WO | 2016043302 A1 | 3/2016 |
| WO | 2018166349 A1 | 9/2018 |

OTHER PUBLICATIONS

European search report and European search opinion dated Sep. 15, 2020; EP 20168947.8.

* cited by examiner

*Primary Examiner* — Jake Cook

(57) ABSTRACT

A robot includes a robot torso, a robot arm, a main controller, and a plurality of bundles of cables; wherein a plurality of shoulder effectors are configured to drive the robot arm to move are disposed on the robot torso, a plurality of arm effectors that are relatively movable are disposed in sequence on the robot arm, and the main controller is disposed on the robot torso and configured to control a corresponding effector to operate, such that the robot arm has a plurality of degrees of freedom; any adjacent two of the main controller, the plurality of shoulder effectors, and the plurality of arm effectors are electrically connected by a cable bundle, each of the plurality of bundles of cables is disposed on an outer surface of the shoulder effector or the arm effector which the bundle of cables travels through.

18 Claims, 18 Drawing Sheets

ROBOT

CROSS-REFERENCE TO RELATED APPLICATIONS

This application claims priority to Chinese Patent Application No. 201920476761.2, filed with the Chinese Patent Office on Apr. 9, 2019, titled "ROBOT", the entire contents of which are incorporated herein by reference.

TECHNICAL FIELD

The present application relates to the technical field of robot manufacturing, and in particular, relates to a robot.

BACKGROUND

The movement system of a robot generally includes a plurality of effectors that are connected in series, and multi-degree-of-freedom (DOF) movement of the robot is implemented under cooperation between the corresponding effectors. A controller may be connected to an effector by a cable, such that a power source and control information may be output to the corresponding effector. Therefore, wiring and deployment of the cables not only directly determine stability of the movement system, but also affect entire appearance design of the robot. Cable margins need to be provided between the corresponding effectors. If the cable margins are over-short, the cables may be pulled when the robot moves, and thus the cables may be prone to damages, or even breakage. As a result, the robot fails to normally operate. On the contrary, if the cable margins are over-long, when the robot moves, the extra cables may not be normally moved in a narrow space of the case of the robot, and may thus press against the case of the robot, which, in case of being severe, may cause the case of the robot to breakage, and affect the appearance of the robot. In addition, if the margins are over-long, materials are wasted, and the cost is increased. Further, in the related art, for the sake of leaving a sufficient deployment space for the cables, design of the case of the robot is generally restricted, which affect entire appearance design of the robot.

SUMMARY

An embodiment of the present application provides a robot. The robot includes a robot torso, a robot arm, a main controller, and a plurality of bundles of cables; wherein a plurality of shoulder effectors are configured to drive the robot arm to move are disposed on the robot torso, a plurality of arm effectors that are relatively movable and connected are disposed in sequence on the robot arm, and the main controller is disposed on the robot torso and configured to control a corresponding effector to operate, such that the robot arm has a plurality of degrees of freedom; any adjacent two of the main controller, the plurality of shoulder effectors, and the plurality of arm effectors are electrically connected by a cable bundle, each of the plurality of bundles of cables is disposed on an outer surface of the shoulder effector or the arm effector which the bundle of cables travels through, and/or each of the plurality of bundles of cables passes through the shoulder effector or the arm effector which the bundle of cables travels through, and/or each of the plurality of bundles of cables passes through a gap between the shoulder effectors which the bundle of cables travels through or a gap between the arm effectors which the bundle of cables travels through or a gap between the shoulder effector and the arm effector which the bundle of cables travels through.

BRIEF DESCRIPTION OF THE DRAWINGS

The accompanying drawings herein are intended to further understanding of the present application, constitute a part of the specification, and serve to illustrate the present application together with the exemplary embodiments below, construing no limitation to the present application. In the drawings.

REFERENCE NUMERALS AND DENOTATIONS THEREOF

Figure 1:
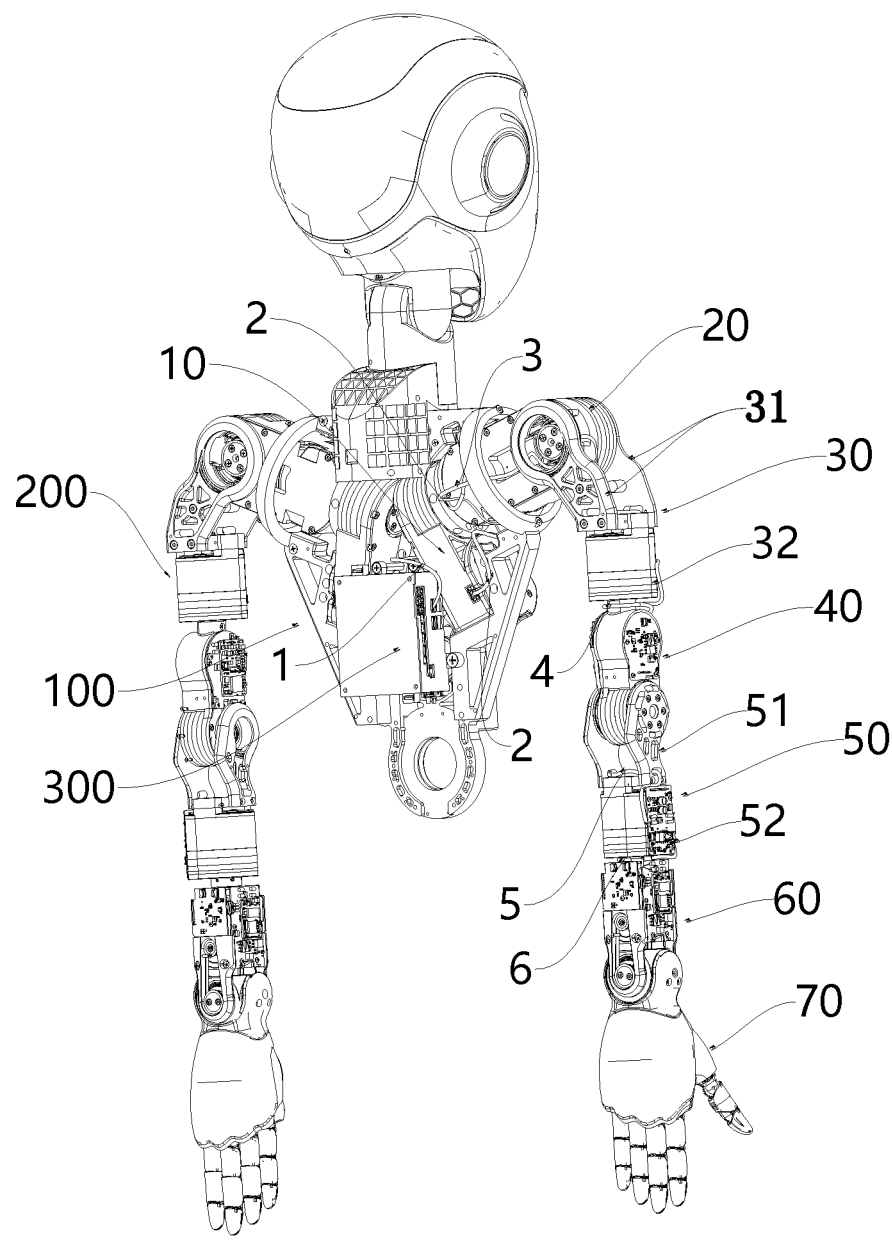
FIG. 1 is a schematic axial view of a robot according to an exemplary embodiment of the present application.

1 First cable
2 Second cable
3 Third cable
4 Fourth cable
5 Fifth cable
6 Sixth cable
10 First shoulder effector
20 Second shoulder effector
21 Shoulder effector rear end cover
211 Second wire through hole
212 Wiring groove 213 Shoulder effector end cover body plate
214 First annular flange
30 Boom effector
31 First connecting plate
311 First wiring hole
32 Boom effector body
40 Elbow effector
41 Elbow effector end cover
411 Fourth wire through hole
412 Elbow effector end cover body plate
413 Second annular flange
50 Forearm effector
51 Second connecting plate
511 Fifth wiring hole
512 Third wiring hole
52 Forearm effector body
60 Wrist effector
100 Robot torso
200 Robot arm
300 Main controller
401 Rotating shaft between the first shoulder effector and the second shoulder effector
402 Rotating shaft between the boom effector and the elbow effector
403 Rotating shaft between the forearm effector and the wrist effector
70 Hand portion

DETAILED DESCRIPTION

The specific embodiments of the present application are described in detail hereinafter with reference to the accompanying drawings. It should be understood that the specific embodiments described herein are only intended to explain the present application instead of limiting the present application.

In the present application, unless otherwise specified, nouns of locality used herein such as "upper", "lower", "top", "bottom", "left", "right", "front", and "rear" are generally defined based on the body of the robot. Specifically, these nouns of locality are defined based on the states where the robot stands upright, keeps stationary and maintains the arm 200 of the robot in a natural prolapse state. The orientation of the head of the robot is defined as top or upper, the orientation of foot of the robot is defined as bottom or lower, the orientation which the robot faces towards is defined as front, and the orientation opposite thereto is defined as rear. When the robot faces towards the front, the orientation of the left hand of the robot is defined as left, and the orientation of the right hand of the robot is defined as right. The nouns of locality such as "interior" and "exterior" refer to interior and exterior of the profile of each part or structure. These nouns of locality are merely intended to illustrate and describe the present application, instead of limiting the present application. In addition, the terms "first", "second", and the like used in the specification are intended to differentiate one element from another, but denote no sequence or imply no importance. In addition, in the description of the reference drawings, like reference signs in different drawings denote like or similar elements.

As illustrated in FIG. 1 to FIG. 24, the present application provides a robot. The robot includes a robot torso 100, a robot arm 200, a main controller 300, and a plurality of bundles of cables; wherein a plurality of shoulder effectors are configured to drive the robot arm 200 to move are disposed on the robot torso 100, a plurality of arm effectors that are relatively movable are disposed in sequence on the robot arm 200, and the main controller 300 is disposed on the robot torso 100 and configured to control a corresponding effector to operate, such that the robot arm 200 has a plurality of degrees of freedom; any adjacent two of the main controller, the plurality of shoulder effectors, and the plurality of arm effectors are electrically connected by a cable bundle, each of the plurality of bundles of cables is disposed on an outer surface of the shoulder effector or the arm effector which the bundle of cables travels through, and/or each of the plurality of bundles of cables passes through the shoulder effector or the arm effector which the bundle of cables travels through, and/or each of the plurality of bundles of cables passes through a gap between the shoulder effectors which the bundle of cables travels through or a gap between the arm effectors which the bundle of cables travels through or a gap between the shoulder effector and the arm effector which the bundle of cables travels through.

With the above technical solution, in the robot according to the present application, with respect to the cable bundles disposed between the main controller 300, the plurality of shoulder effectors, and the plurality of arm effectors, except the cables disposed in the corresponding effectors, the other cables are disposed along the outer surfaces of the corresponding effectors, that is, attached on the outer surface of the effectors, or some of the cables are disposed in the gap between the adjacent effectors. Based on this configuration, when the main controller 300 controls the plurality of shoulder effectors and the plurality of arm effectors to move, the cables on the outer surface of the effectors are attached on the outer surface of the effectors and may not protrude outwards, such that the case of the robot may not be pressed against outwards. Therefore, the case where the case of the robot is broken because the cables press against the case of the robot is prevented, and cables are saved. In addition, by controlling cable margins disposed in the gap between the adjacent effectors, when the two adjacent effectors move relative to each other, the effectors may not pull the cables. Therefore, the case where the cables are damaged or even pulled to breakage due to pulling of the cables is prevented, such that it is ensured that the deployment of the cables does not affect the movement of the robot, and is favorable to ensuring stability of the movement system of the robot. Furthermore, based on deployment of the cables in the present application, design of the case of the robot may not be restricted by deployment of the cables, which gives a good appearance for the robot.

In addition, in the robot according to the present application, from the main controller 300 to the lowermost effectors on the robot arm 200, two adjacent effectors are electrically connected by a separate cable. That is, the main controller 300 and the effectors are connected to each other in series by a multi-segment-type cable. As compared with the technical solution in the related art that the main controller is connected to each of the effectors by a separate cable, the multi-segment-type series connection according to the present application decreases the length of each bundle of cables, which may reduce the difficulty in deploying the cables while saving the materials. In this way, the risks that the cables press against the case of the robot and winds the effectors are lowered.

It should be noted that in the present application, with respect to a single bundle of cables, besides the remaining cables disposed in the corresponding effector, the cables of the single bundle of cables that are exposed out of the effector may be such disposed that one part of the cables is disposed along outer surfaces of two adjacent corresponding effectors, and the other part of the cables is disposed in the gap between the two adjacent effectors; alternatively, it is also possible that the exposed cables of the single bundle of cables are totally disposed along the outer surfaces of the two adjacent corresponding effectors, or the exposed cables of the single bundle of cables are totally disposed in the gap between the two adjacent effectors. According to a positional relationship, a connection relationship, and a relative movement relationship between two adjacent effectors, a different cable routing fashion may be correspondingly selected, which is not limited in the present application.

The effector of the robot is a device configured to receive control information and apply a control effect on an object under control, and is generally provided with a motor, a reducer, and the like. Operating principles of the effector are well known to a person skilled in the art, which are not described herein any further.

In the present application, in consideration of the degree-of-freedom desired by arm design of the robot, the robot arm 200 may be provided with any suitable number of effectors, and correspondingly, may also be provided with a corresponding number of cables. The present disclosure sets no limitations on the number of shoulder effectors and the number of effectors on the robot arm 200.

In a specific embodiment of the present application, as illustrated in FIG. 1, the shoulder effector includes a first shoulder effector 10 and a second shoulder effector 20, and the arm effector includes a boom effector 30, an elbow effector 40, a forearm effector 50, and a wrist effector 60 that are connected in sequence, wherein the boom effector 30, the elbow effector 40, the forearm effector 50, and the wrist effector 60 constitute the robot arm 200.

The first shoulder effector 10 is disposed between the main controller 300 and the second shoulder effector 20, and one end of the second shoulder effector 20 is connected to the boom effector 30 to drive the boom effector 30 to move, for example, to drive the boom effector 30 to rotate leftwards and rightwards about a connecting shaft between the boom effector 30 and the second shoulder effector 20, or to drive the boom effector 30 to horizontally move or to move upwards and downwards relative to the second shoulder effector 20. The first shoulder effector 10 is connected to the other end of the second shoulder effector 20 to drive the second shoulder effector 20 to move, for example, to drive the second shoulder effector 20 to rotate forwards and backwards about a connecting shaft between the second shoulder effector 20 and the first shoulder effector 10. An upper effector in the plurality of effectors of the robot arm 200 is capable of driving a lower effector that is adjacent to the upper effector to move, and a movement relationship among the plurality of effectors of the robot arm 200 may be determined according to the design requirements.

Correspondingly, as illustrated in FIG. 1, the plurality of bundles of cables include a first cable 1, a second cable 2, a third cable 3, a fourth cable 4, a fifth cable 5, and a sixth cable 6, wherein the first cable 1 is electrically connected to the main controller 300 and the first shoulder effector 10, the second cable 2 is electrically connected to the first shoulder effector 10 and the second shoulder effector 20, the third cable 3 is electrically connected to the second shoulder effector 20 and the boom effector 30, the fourth cable 4 is electrically connected to the boom effector 30 and the elbow effector 40, the fifth cable 5 is electrically connected to the elbow effector 40 and the forearm effector 50, and the sixth cable 6 is electrically connected to the forearm effector 50 and the wrist effector 60, such that the main controller 300 is capable of controlling the corresponding effector to operate.

Referring to FIG. 1 to FIG. 24, based on a positional relationship, a connection relationship, and a relative movement relationship among the main controller 300, the shoulder effectors, and the plurality of arm effectors, deployment of the cables is specifically described hereinafter.

In an exemplary embodiment of the present application, as illustrated in FIG. 1 to FIG. 3, and FIG. 7, the main controller 300 may be disposed on a back of the robot torso 100. Specifically, the controller 300 may be disposed on an inner skeleton of the robot torso 100. One end of the first cable 1 is connected to an electrical signal output port of the main controller 300, and the other end of the first cable 1 passes through the gap defined between the left first shoulder effector 10 and the right first shoulder effector 10 on the robot torso 100 and is connected to an electrical signal input port on a front side of the first shoulder effector 10. During the operation, the main controller 300 energizes the first shoulder effector 10 by the first cable 1, and transmits a control signal to the first shoulder effector 10, such that the first shoulder effector 10 drives the second shoulder effector 20 to move to drive the robot arm 200 to perform corresponding actions, such as, rotating forwards and backwards, horizontally moving forwards and backwards, and the like.

In an exemplary embodiment of the present application, the first shoulder effector 10 may be configured to drive the second shoulder effector 20 to rotate forwards and backwards to drive the robot arm 200 to move forwards and backwards. Similarly, the first shoulder effector 10 energizes the second shoulder effector 20 by the second cable 2, and transmits a control signal to the second shoulder effector 20.

Specifically, as illustrated in FIG. 1, FIG. 4, FIG. 8, and FIG. 13, one end of the second cable 2 is connected to an electrical signal output port on a rear side of the first shoulder effector 10, and the other end of the second cable 2 is partially wound from the front to the rear on a rotating shaft 401 between the first shoulder effector 10 and the second shoulder effector 20 and disposed in the gap therebetween, and is electrically connected to an electrical signal input port at a front-side upper position of the second shoulder effector 20. Based on this, when the first shoulder effector 10 rotates forwards and backwards relative to the second shoulder effector 20, the second cable 2 is capable of rotating with the rotation of the rotating shaft 401 between the first shoulder effector 10 and the second shoulder effector 20. In addition, since the part of the second cable 2 which rotates relative to the rotating shaft is disposed in the gap, a case of the robot may not be pressed outwards. In addition, by reasonably arranging a cable margin of the second cable 2 disposed in the gap as described above, it is ensured that when the second shoulder effector 20 rotates relative to the first shoulder effector 10, the effector may not pull the second cable 2.

In an exemplary embodiment of the present application, the second shoulder effector 20 may be connected to an upper end of the boom effector 30 to drive the boom effector 30 to move leftwards and rightwards. The second shoulder effector 20 energizes the boom effector 30 by the third cable 3, and transmits a control signal to the boom effector 30.

As illustrated in FIG. 1, FIG. 2, FIG. 4, and FIG. 10, the boom effector 30 includes a boom effector body 32 and a pair of first connecting plates 31 fixedly connected to an upper end of the boom effector body 32 and configured to be connected to the second shoulder effector 20, wherein upper ends of the pair of first connecting plates 31 are rotatably connected to front and rear sides of the second shoulder effector 20, and each lower end of the pair of first connecting plates 31 are provided with first wiring holes 311.

One end of the third cable 3 is connected to an electrical signal output port at a rear-side lower position of the second shoulder effector 20, and the other end of the third cable 3 extends upwards and bypasses over the second cable 2, extends along a rear-side outer surface of the first shoulder effector 10 and passes through a second wire through hole 211 disposed on an end portion of the second shoulder effector 20, extends between the pair of first connecting plates 31, then passes from interior to exterior through the first wiring hole 311 on the first connecting plate 31 on a front side, and finally extends along an outer surface of the boom effector body 32 and is connected to an electrical signal input port on the boom effector body 32. That is, a part of the third cable 3 is disposed along an outer surface of the second shoulder effector 20, a part of the third cable 3 is disposed between the pair of first connecting plates 31 of the boom effector 30, and the remaining part of the third cable 3 is disposed along the outer surface of the boom effector body 32. The part of the third cable 3 that is disposed between the pair of first connecting plates 31 may not press against the case of the robot during the movement, and thus a suitable margin may be disposed. Based on this, when the boom effector 30 rotates leftwards and rightwards relative to the second shoulder effector 20 (that is, rotate about a connecting shaft perpendicular to a drawing surface direction as illustrated in FIG. 4), the third cable 3 neither presses against the case of the robot, nor suffers from the pull of the second shoulder effector 20 and the boom effector 30.

In this embodiment, to further ensure that the part of the third cable 3 that is disposed between the second shoulder effector 20 and the boom effector body 32 is constantly attached on the outer surface of the corresponding effector, line clampers (not illustrated in drawings) may be disposed on the second shoulder effector 20 and the boom effector body 32, such that the third cable 3 may not press outwards against the case of the robot during the process that the boom effector 30 moves relative to the second shoulder effector 20.

Figure 2:
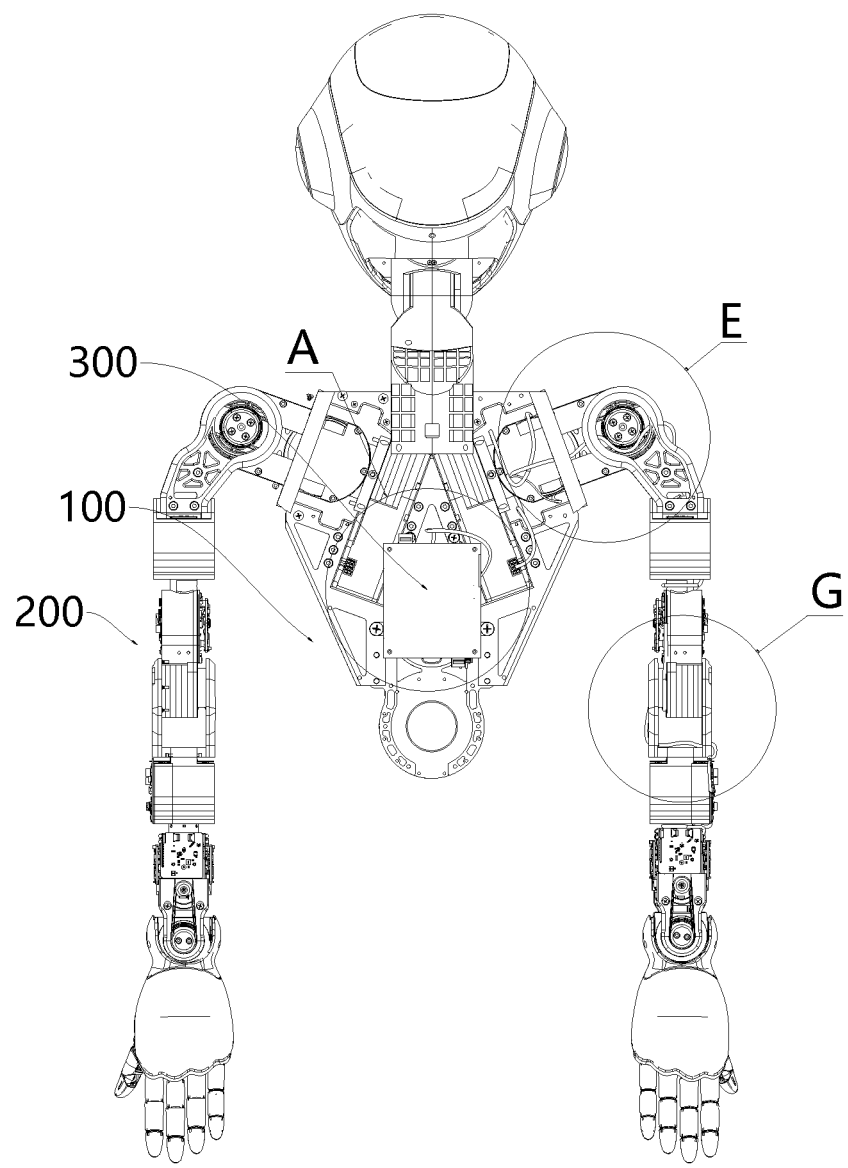
FIG. 2 is a schematic rear view of the robot according to an exemplary embodiment of the present application.
Figure 3:
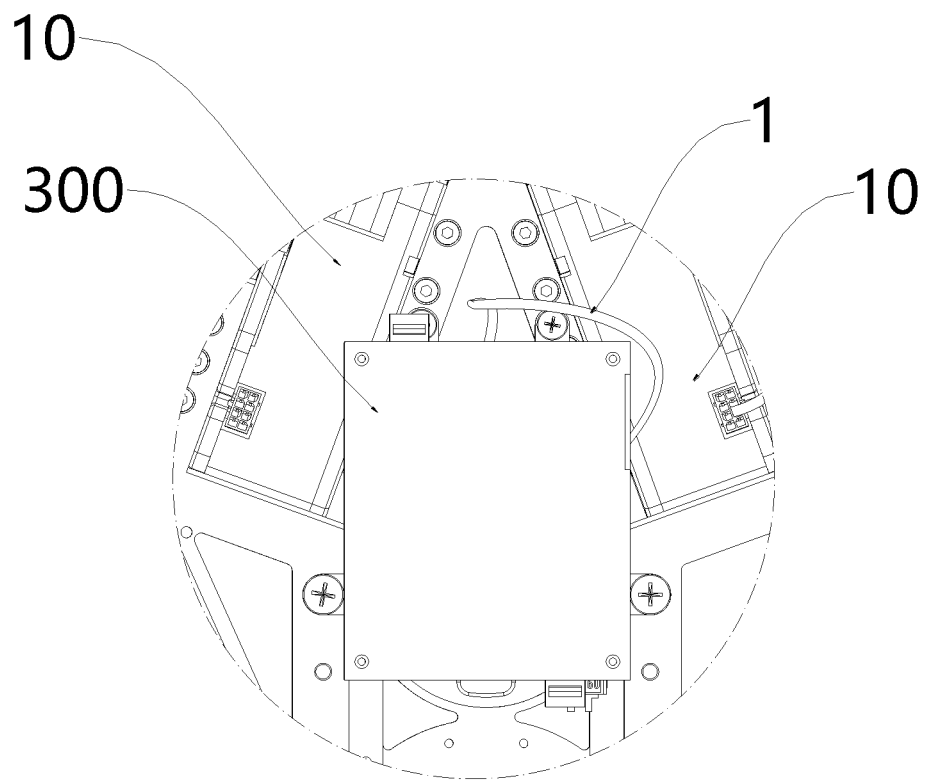
FIG. 3 is a schematic enlarged view of part A in FIG. 2.
Figure 4:
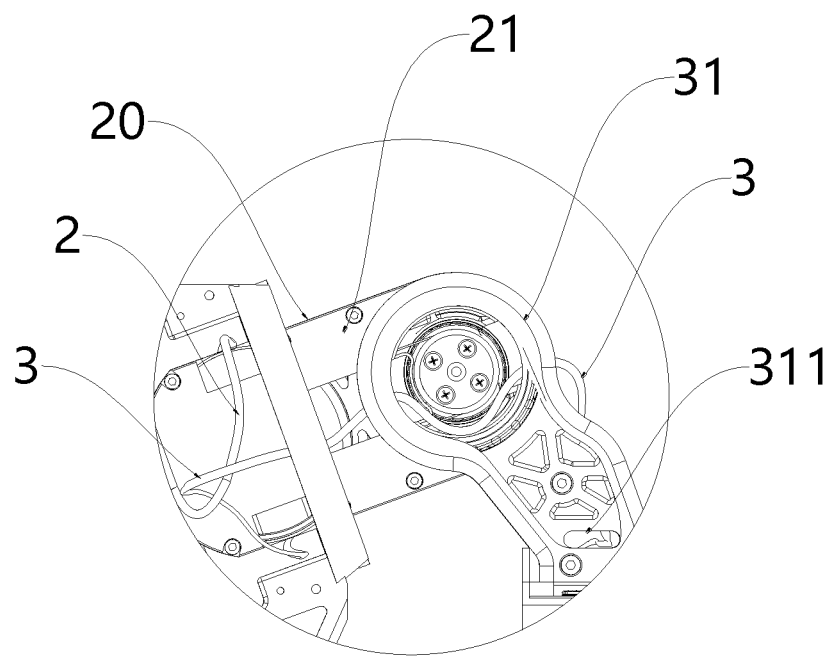
FIG. 4 is a schematic enlarged view of part E in FIG. 2.
Figure 21:
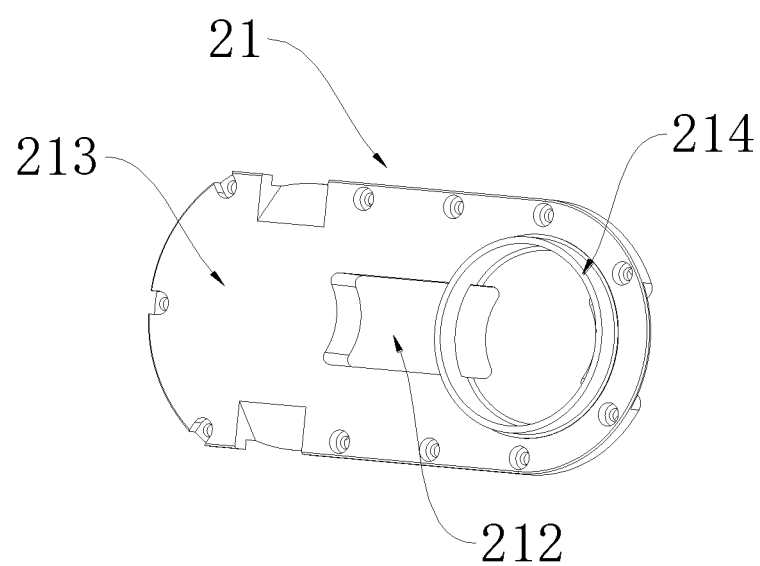
FIG. 21 is a schematic axial view of a shoulder effector rear end cover according to an exemplary embodiment of the present application.

Further, as illustrated in FIG. 4 and FIG. 21, the second shoulder effector 20 includes a shoulder effector rear end cover 21 disposed on a rear side thereof. The shoulder effector rear end cover 21 includes a shoulder effector end cover body plate 213 and a first annular flange 214 defined on the shoulder effector end cover body plate 213, an outer surface of the shoulder effector end cover body plate 213 is provided with a wiring groove 212 extending along a lengthwise direction thereof (that is, an extension direction of the second shoulder effector 20 as illustrated in FIG. 4 and FIG. 2), wherein the wiring groove 212 extends to the interior of the first annular flange 214, and a side on a side wall of the first annular flange 214 opposite to the wiring groove 212 is provided with the second wire through hole 211. The other end of the third cable 3 extends in the wiring groove 212 and enters the interior of the first annular flange 214, and is then led out from the second wire through hole 211 to a position between the pair of first connecting plates 31. Based on this, the third cable 3 may be attached on the outer surface of the second shoulder effector 20. Due to the presence of the first annular flange 214, the part of the third cable 3 which is rotatably connected between the second shoulder effector 20 and the pair of first connecting plates 31 may not be wound, such that the safety of the third cable 3 is ensured.

Figure 22:
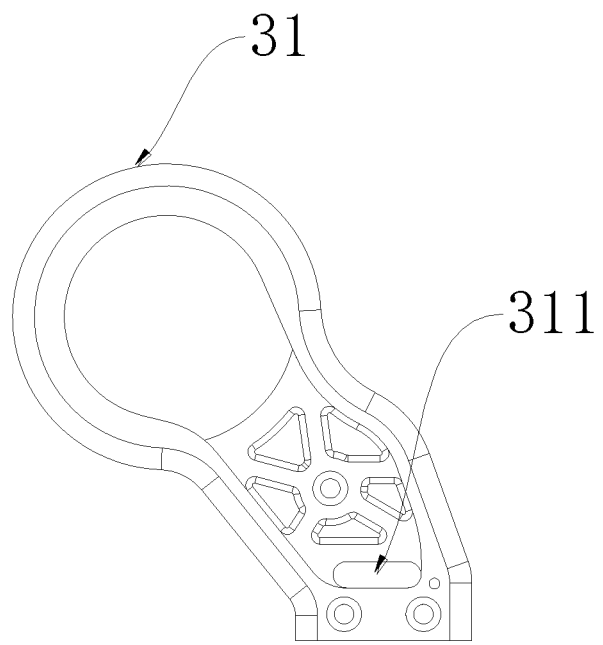
FIG. 22 is a schematic axial view of a first connecting plate according to an exemplary embodiment of the present application.
Figure 23:
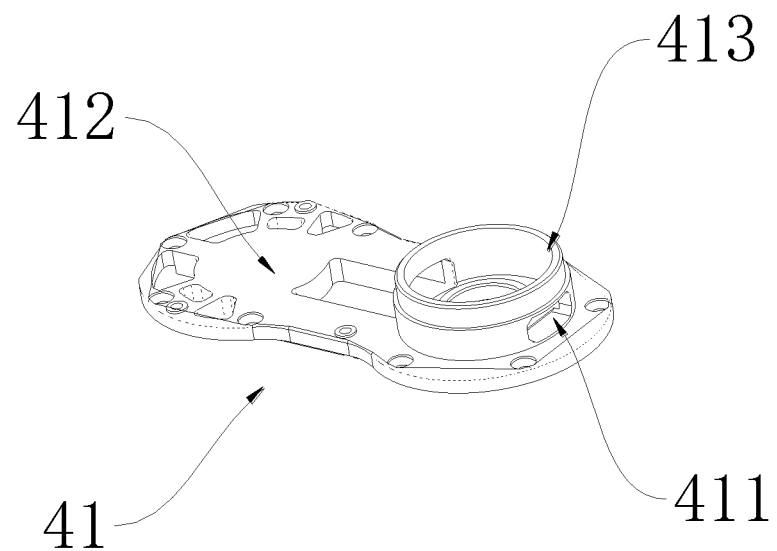
FIG. 23 is a schematic axial view of an elbow effector end cover according to an exemplary embodiment of the present application.

As illustrated in FIG. 4 and FIG. 22, the first wiring hole 311 is an elongated circular hole disposed along a widthwise direction (that is, the left and right directions of the robot as illustrated in FIG. 4) of the first connecting plate 30, such that during the movement, the third cable 3 is capable of fine-adjusting the position in the elongated circular hole.

In an exemplary embodiment of the present application, a lower end of the boom effector 30 is connected to an upper end of the elbow effector 40 to drive the elbow effector 40 to rotate about an axial line of the boom effector 300. Specifically, a lower end of the boom effector body 32 may be rotatably connected to the upper end of the elbow effector 40, and the boom effector 30 energizes the elbow effector 40 by the fourth cable 4, and transmits a control signal to the elbow effector 40.

Figure 10:
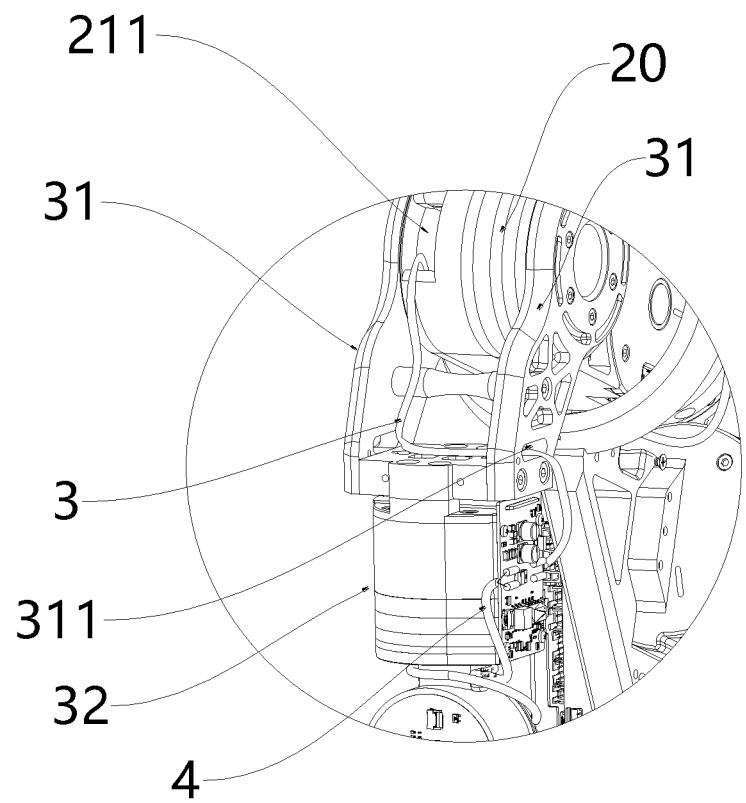
FIG. 10 is a schematic enlarged view of part F in FIG. 9.
Figure 11:
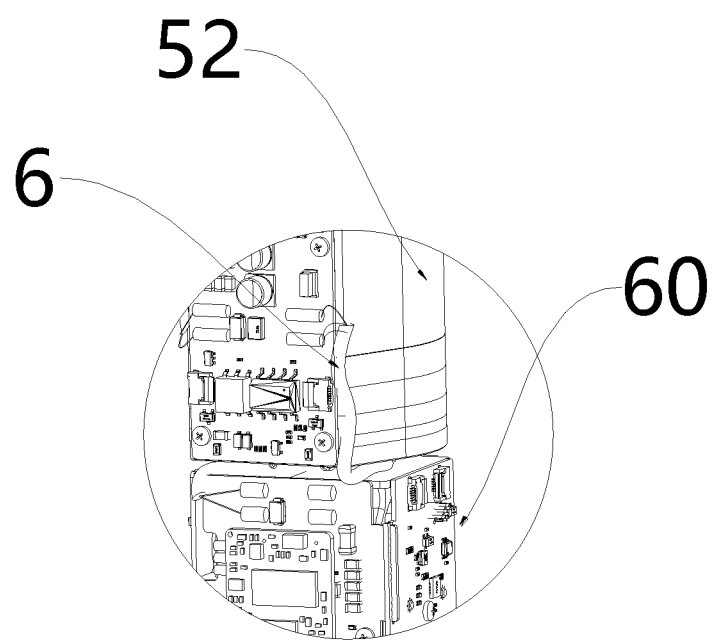
FIG. 11 is a schematic enlarged view of part I in FIG. 9.
Figure 12:
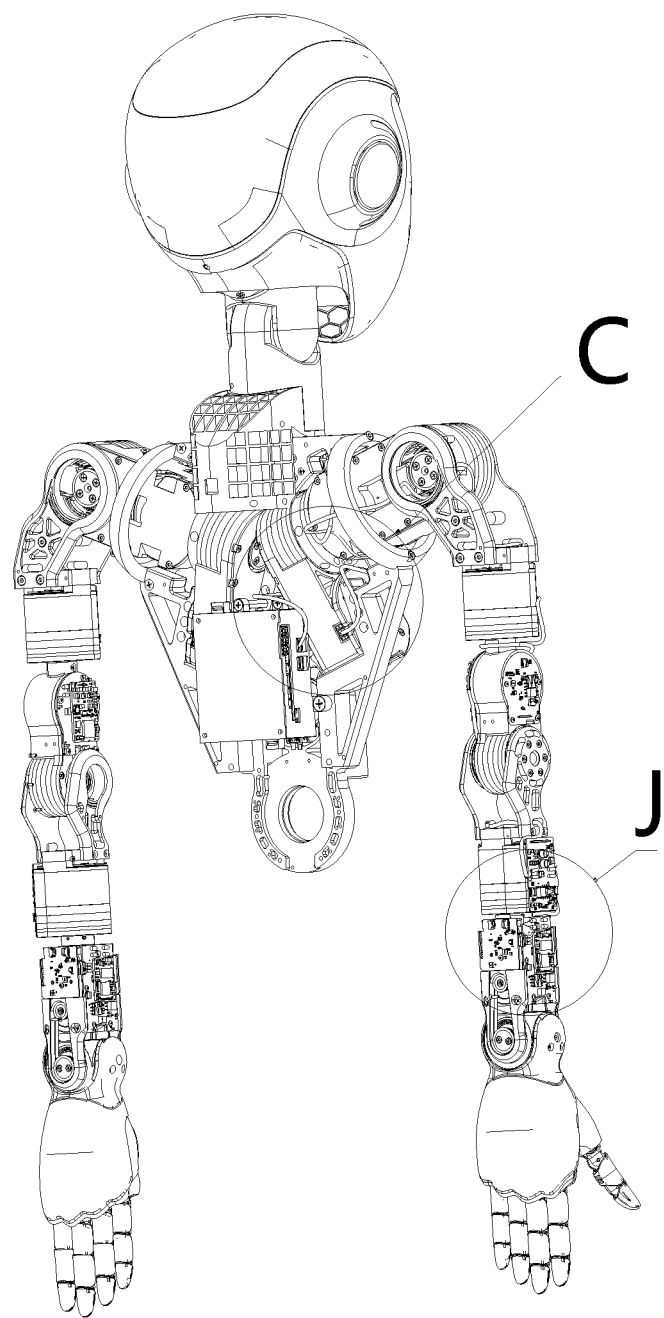
FIG. 12 is a schematic axial view of a robot according to an exemplary embodiment of the present application.
Figure 13:
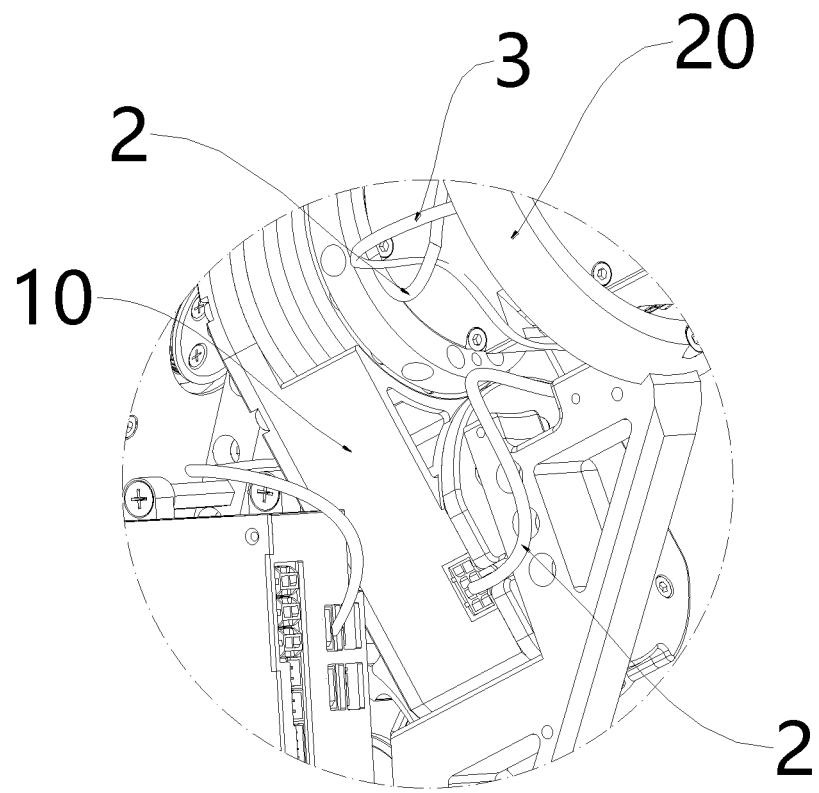
FIG. 13 is a schematic enlarged view of part C in FIG. 12.
Figure 20:
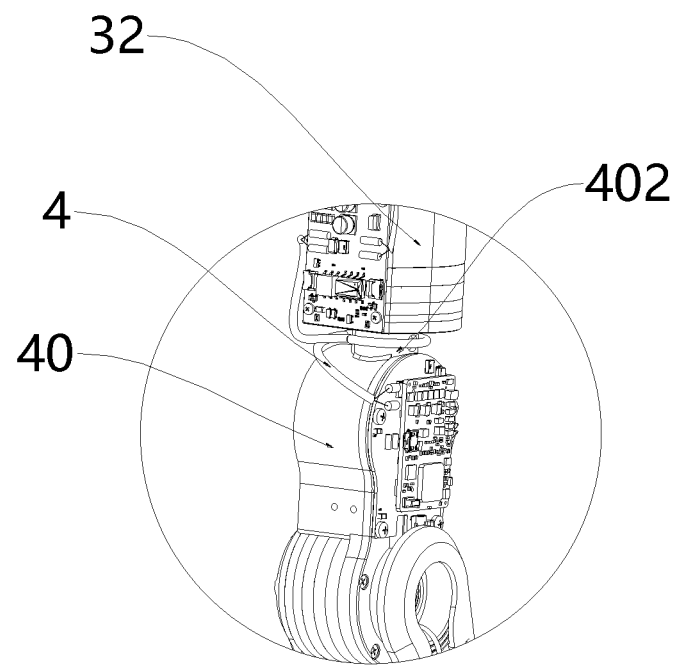
FIG. 20 is a schematic enlarged view of part M in FIG. 19.

As illustrated in FIG. 1, FIG. 10, and FIG. 20, an upper end of the fourth cable 4 is connected to an electrical signal output port of the boom effector 30, and the other end of the fourth cable 4 is wound on a rotating shaft 402 between the boom effector 30 and the elbow effector 40 and disposed in the gap therebetween, and is connected to an electrical signal input port of the elbow effector 40.

Based on this, when the elbow effector 40 rotates relative to the boom effector 30, the fourth cable 4 is capable of rotating with the rotation of the rotating shaft 402 between the boom effector 30 and the elbow effector 40. In addition, since one part of the fourth cable 4 is disposed in the gap and the other part of the fourth cable is attached on the outer surfaces of the boom effector 30 and the elbow effector 40, the case of the robot may not be pressed outwards. In addition, by reasonably arranging a cable margin of the fourth cable 4 disposed in the gap as described above, it is ensured that when the boom effector 30 rotates relative to the elbow effector 40, or the boom effector 30 and the elbow effector 40 rotate relative to the second shoulder effector 20, the effector may not pull the fourth cable 4.

In an exemplary embodiment of the present application, a lower end of the elbow effector 40 may be connected to an upper end of the forearm effector 50 to drive the forearm effector 50 to move upwards and downwards. The elbow effector 40 energizes the forearm effector 50 by the fifth cable 5, and transmits a control signal to the forearm effector 50.

As illustrated in FIG. 1, FIG. 5, FIG. 16, and FIG. 18, the forearm effector 50 includes a forearm effector body 52 and a pair of second connecting plates 51 fixedly connected to an upper end of the forearm effector body 52 and configured to be connected to the elbow effector 40, wherein upper ends of the pair of second connecting plates 51 is rotatably connected to two opposing sides of the elbow effector 40, and each lower end of the pair of second connecting plates 51 is provided with a third wiring hole 512.

One end of the fifth cable 5 is connected to an electrical signal output port of the elbow effector 40, and the other end of the fifth cable 5 extends downwards along an outer surface of the elbow effector 40 and passes through a fourth wire through hole 411 disposed on an end portion of the elbow effector 40, then passes from interior to exterior through a fifth wiring hole 511 at an upper end of one second connecting plate 51, extends downwards along an outer surface of the second connecting plate 51, passes from exterior to interior through the third wiring hole 512 disposed at a lower end of the second connecting plate 51, extends between the pair of second connecting plates 51, and finally passes from interior to exterior through the third wiring hole 512 on the other second connecting plate 51, extends along an outer surface of the forearm effector body 52 and is then connected to an electrical signal input port on the forearm effector body 52.

That is, a part of the fifth cable 5 is disposed along the outer surface of the elbow effector 40, a part of the fifth cable 5 is disposed between the pair of second connecting plates 51 of the forearm effector 50, a part of the fifth cable 5 is disposed on the outer surface of the second connecting plate 51, and the remaining of the fifth cable 5 is disposed along the outer surface of the forearm effector body 52. The part of the fifth cable 5 that is disposed between the pair of second connecting plates 51 may not press against the case of the robot during the movement, and thus a suitable margin may be disposed. Based on this, when the forearm effector 50 rotates relative to the elbow effector 40, the fifth cable 5 neither presses against the case of the robot, nor suffers from the pull of the forearm effector 50 and the elbow effector 40.

In this embodiment, to further ensure that the part of the fifth cable 5 that is disposed between the elbow effector 40 and the forearm effector body 52 is constantly attached on the outer surface of the corresponding effector, line clampers (not illustrated in drawings) may be disposed on the elbow effector 40 and the forearm effector body 52, such that the fifth cable 5 may not press outwards against the case of the robot during the process that the forearm effector 50 moves relative to the elbow effector 40.

Figure 5:
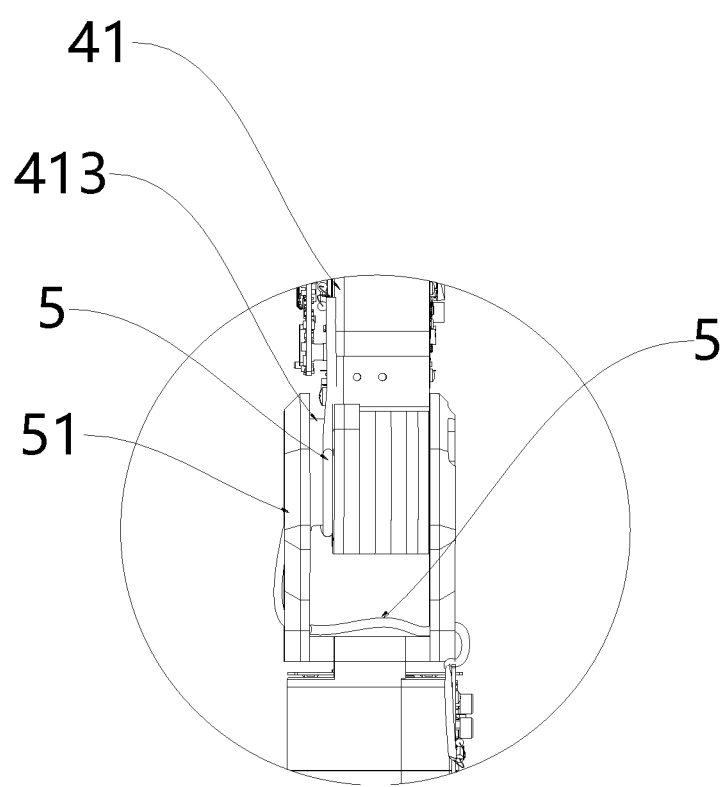
FIG. 5 is a schematic enlarged view of part G in FIG. 2.
Figure 6:
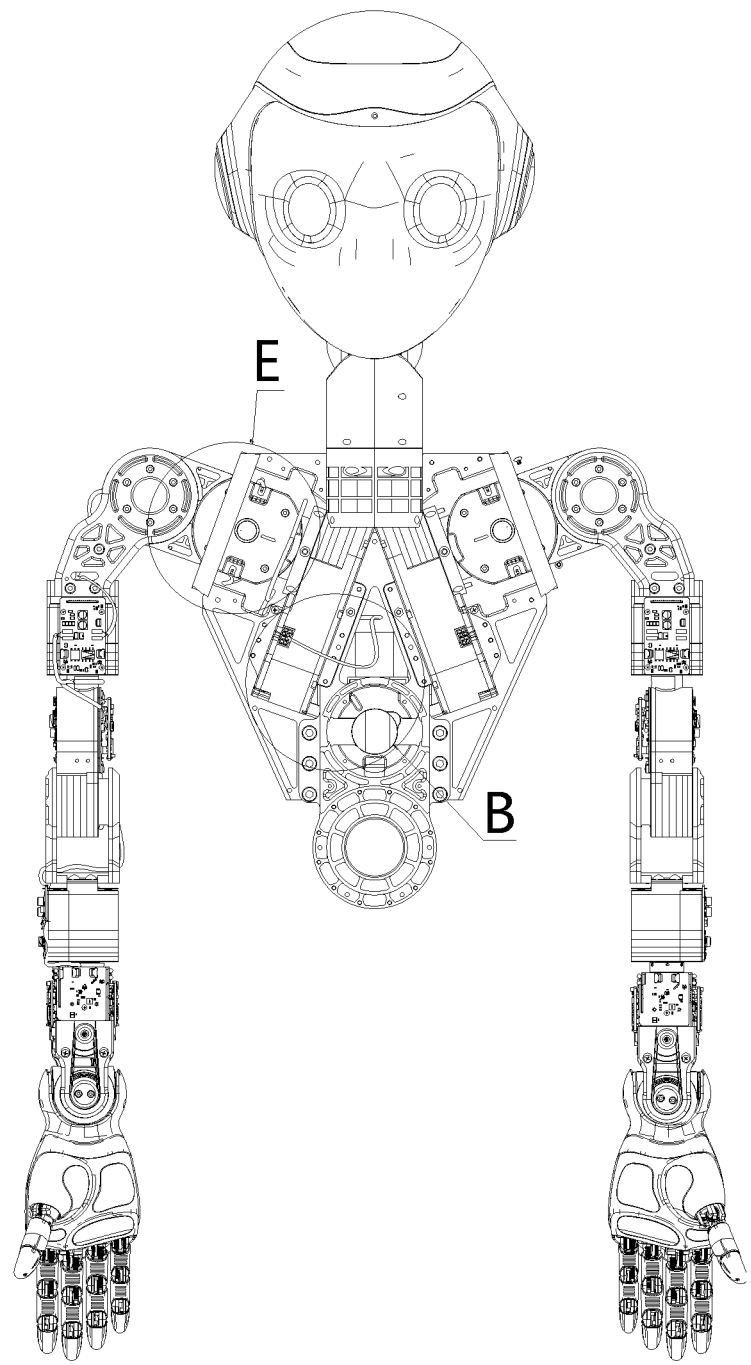
FIG. 6 is a schematic front view of a robot according to an exemplary embodiment of the present application.
Figure 7:
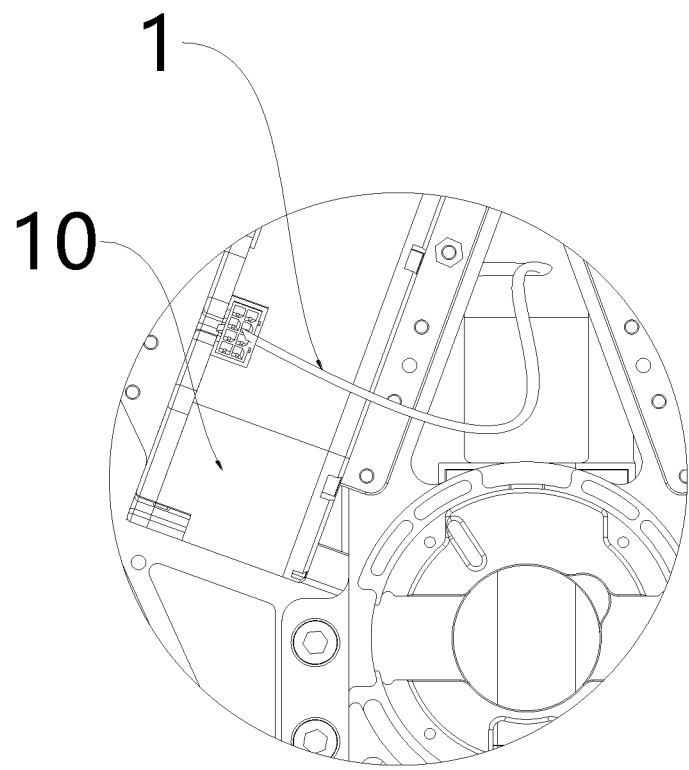
FIG. 7 is a schematic enlarged view of part B in FIG. 6.
Figure 8:
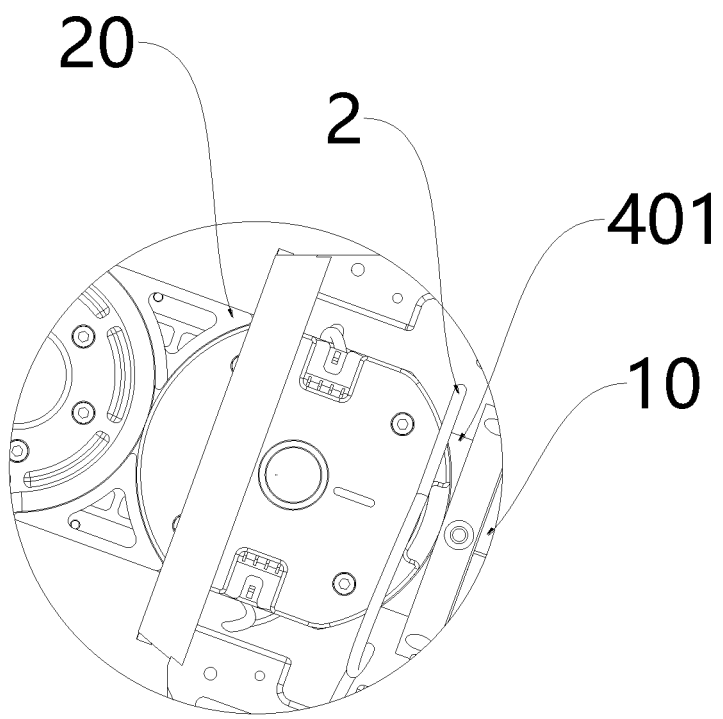
FIG. 8 is a schematic enlarged view of part E in FIG. 6.

Specifically, as illustrated in FIG. 1, FIG. 5, FIG. 23, and FIG. 24, the elbow effector 40 includes an elbow effector end cover 41 disposed on a rear side thereof, wherein the elbow effector end cover 41 includes an elbow effector end cover body plate 412 and a second annular flange 413 defined on the elbow effector end cover body plate 412, wherein an interior of the second annular flange 413 is in communication with the fifth wiring hole 511 on the one second connecting plate 51 (the second connecting plate 51 disposed on a left side as illustrated in FIG. 5), and the fourth wire through hole 413 is disposed at a lower part of a side wall of the second annular flange 413. The other end of the fifth cable 5 extends along an outer surface of the elbow effector end cover 41 and is partially wound on an outer side of the second annular flange 413, then enters the interior of the second annular flange 413 from the fourth wiring hole 411, and is finally led out from interior to exterior from the fifth wiring hole 511. Based on this, the part of the fifth cable 5 that is wound on the second annular flange 413 is capable of rotating with the rotation of the forearm effector 50 and the elbow effector 40, and thus the fifth cable 5 may not be pulled.

Figure 15:
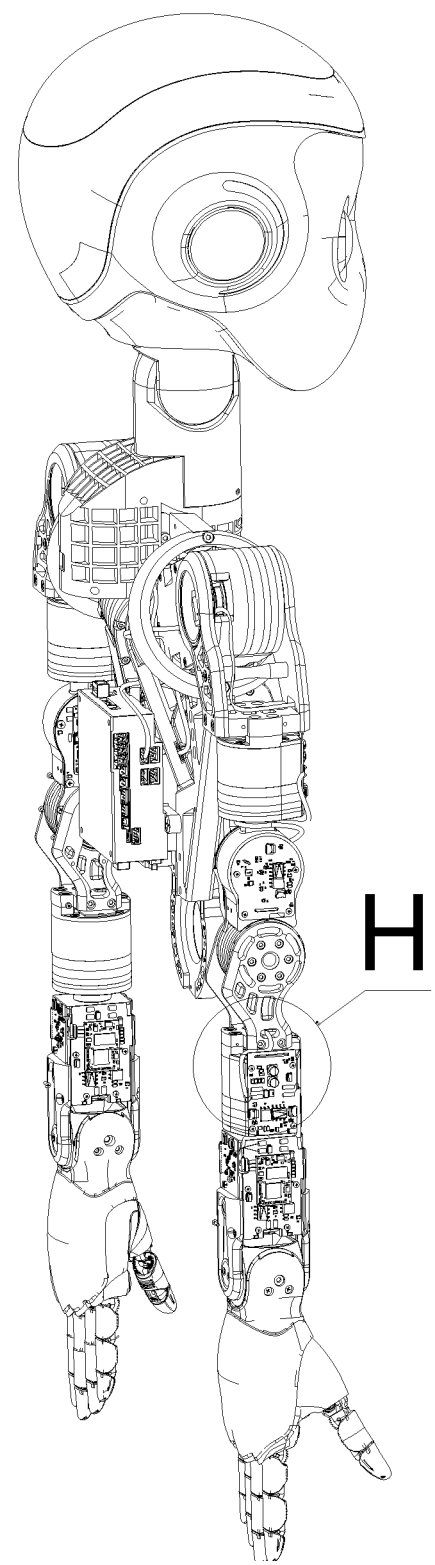
FIG. 15 is a schematic axial view of a robot according to an exemplary embodiment of the present application.
Figure 16:
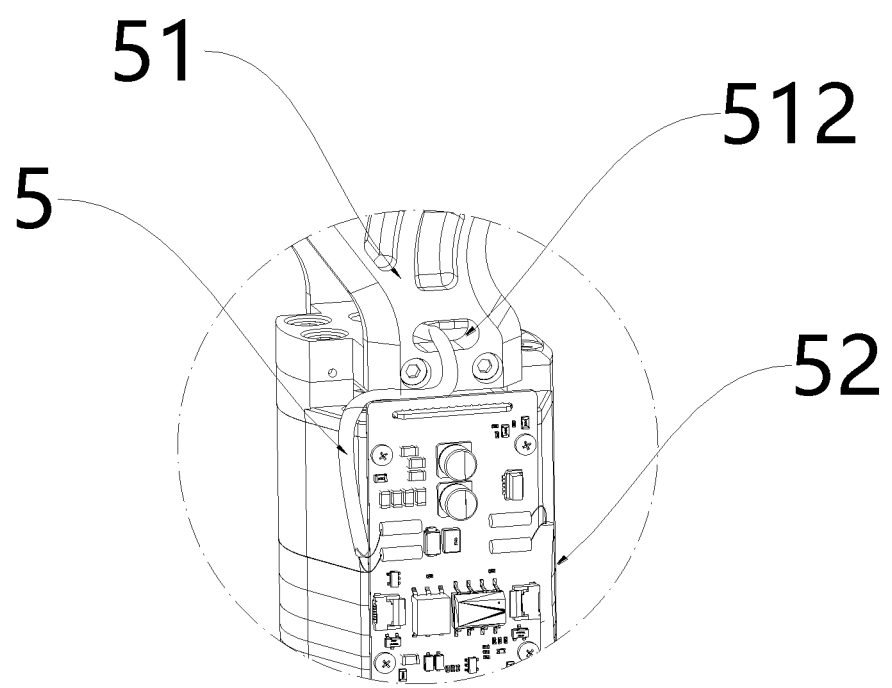
FIG. 16 is a schematic enlarged view of part H in FIG. 15.
Figure 17:
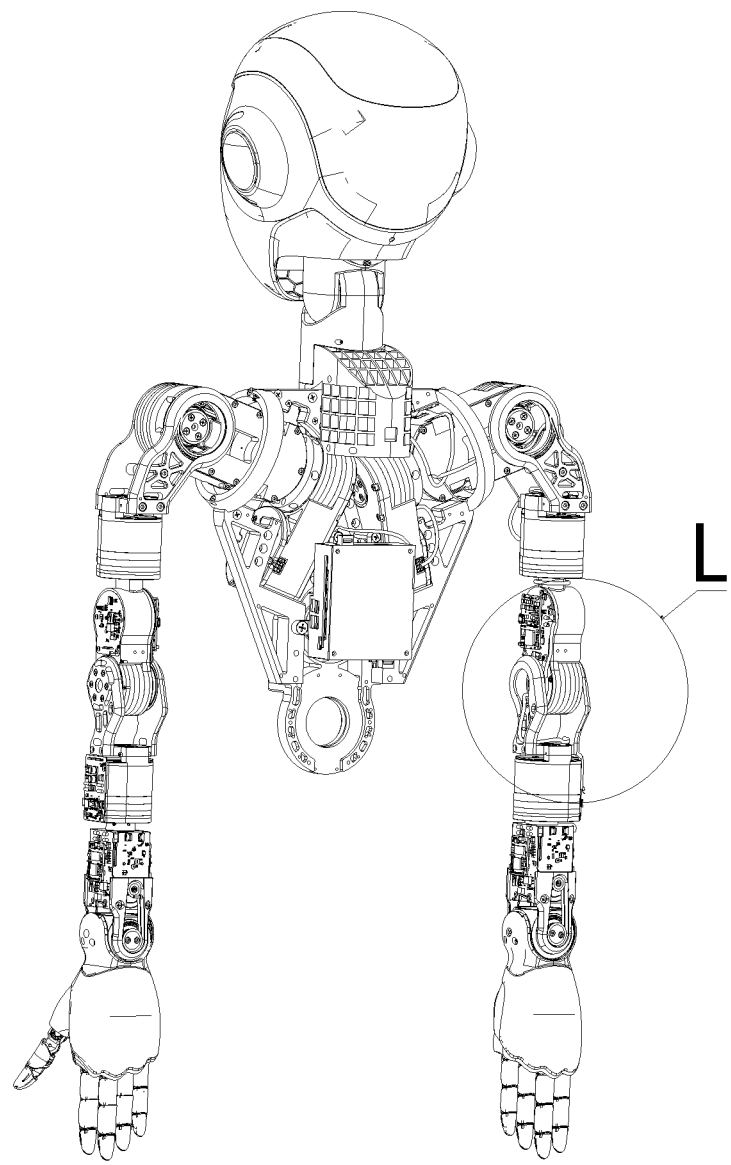
FIG. 17 is a schematic axial view of a robot according to an exemplary embodiment of the present application.
Figure 18:
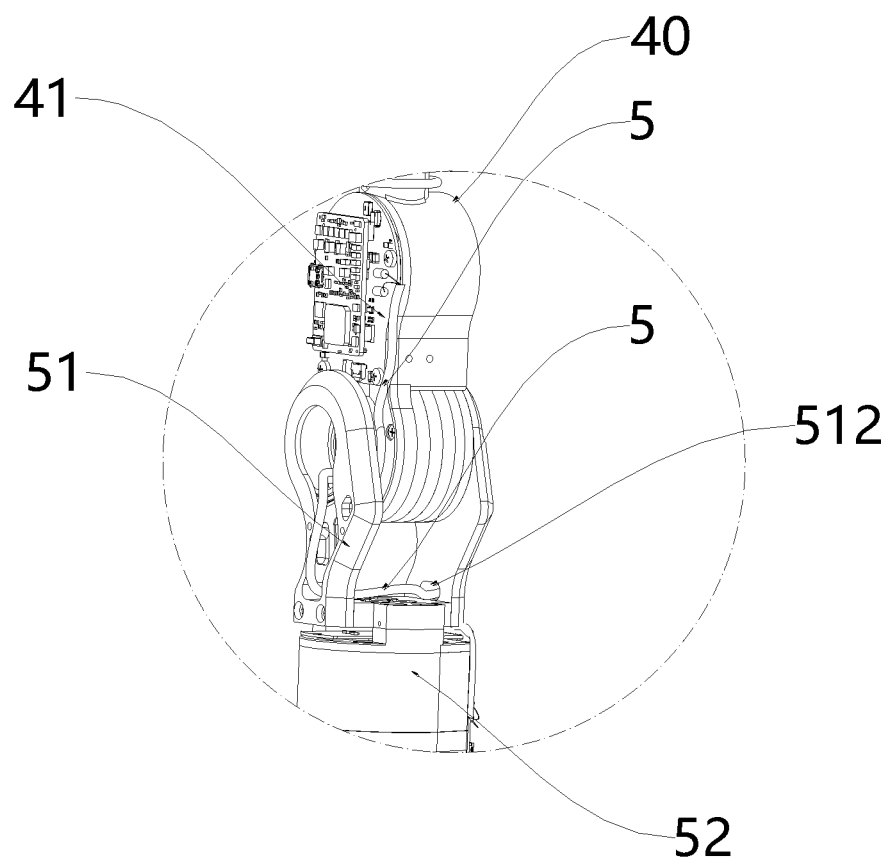
FIG. 18 is a schematic enlarged view of part L in FIG. 17.
Figure 19:
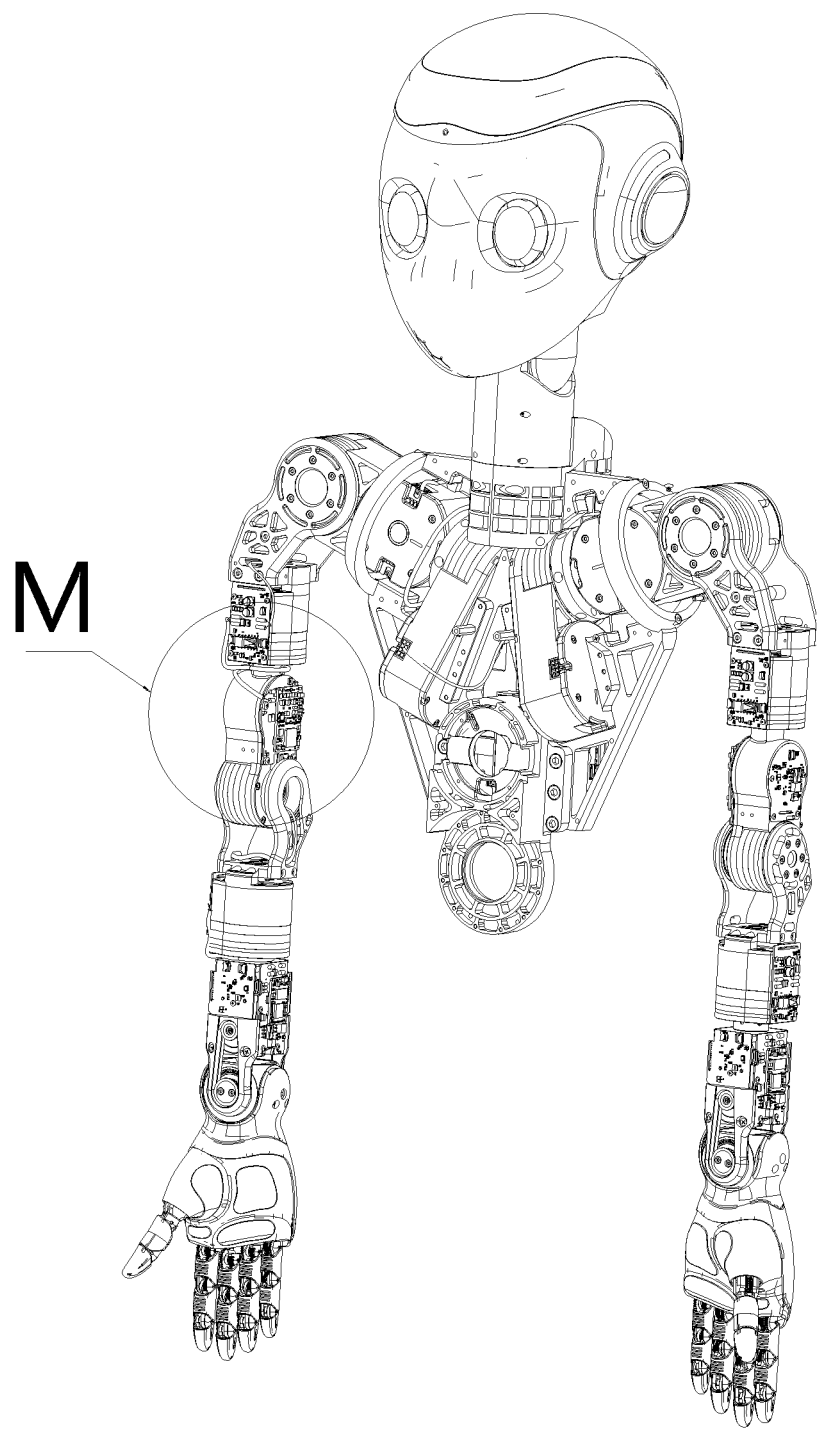
FIG. 19 is a schematic axial view of a robot according to an exemplary embodiment of the present application.
Figure 24:
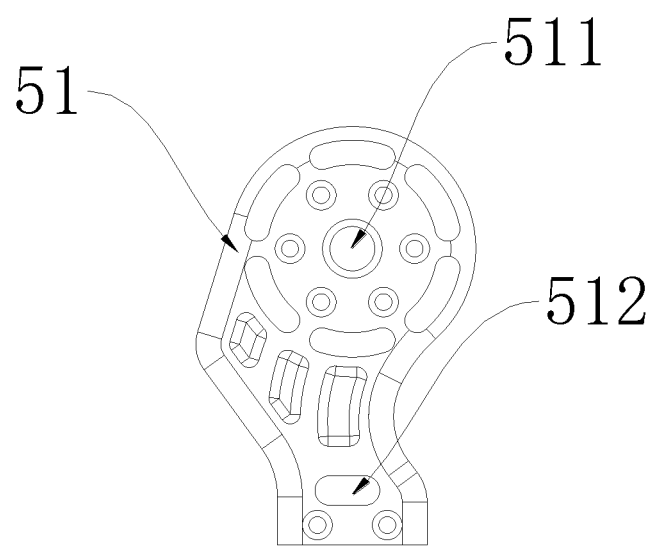
FIG. 24 is a schematic axial view of a second connecting plate according to an exemplary embodiment of the present application.

As illustrated in FIG. 16 and FIG. 24, the third wiring hole 512 is an elongated circular hole disposed along a widthwise direction (that is, the front and rear directions of the robot as illustrated in FIG. 15) and of the second connecting plate 51, such that during the movement, the fifth cable 5 is capable of trimming the position in the elongated circular hole.

In an exemplary embodiment of the present application, a lower end of the forearm effector 50 is connected to an upper end of the wrist effector 60 to drive the wrist effector 60 to rotate about an axial line of the forearm effector 50. The forearm effector 50 energizes the wrist effector 60 by the sixth cable 6, and transmits a control signal to the wrist effector 60.

Figure 9:
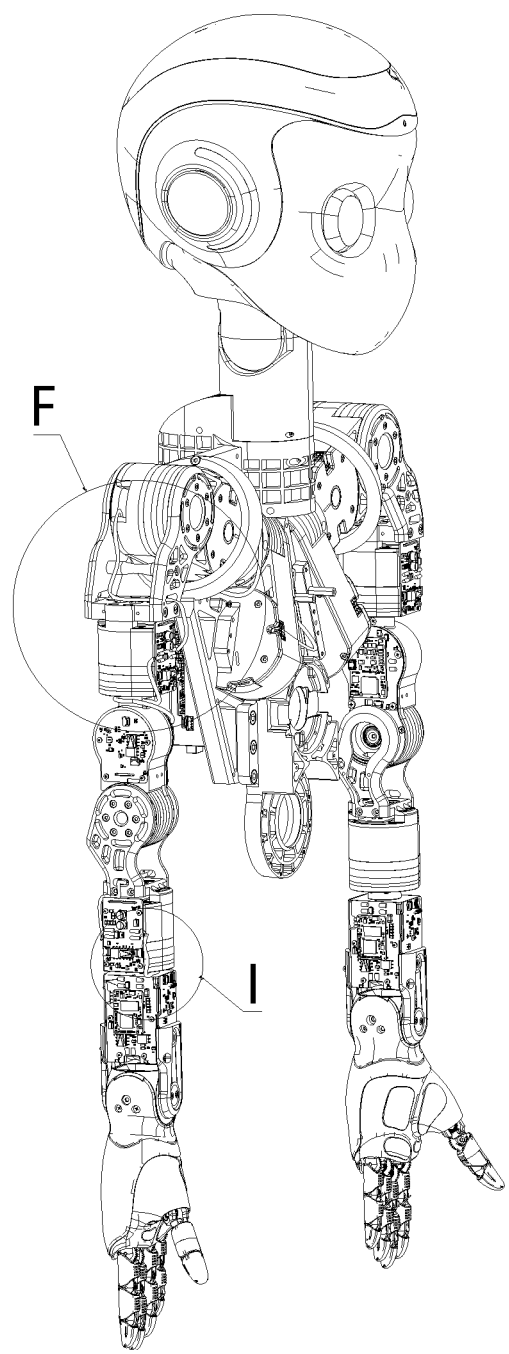
FIG. 9 is a schematic axial view of a robot according to an exemplary embodiment of the present application.
Figure 14:
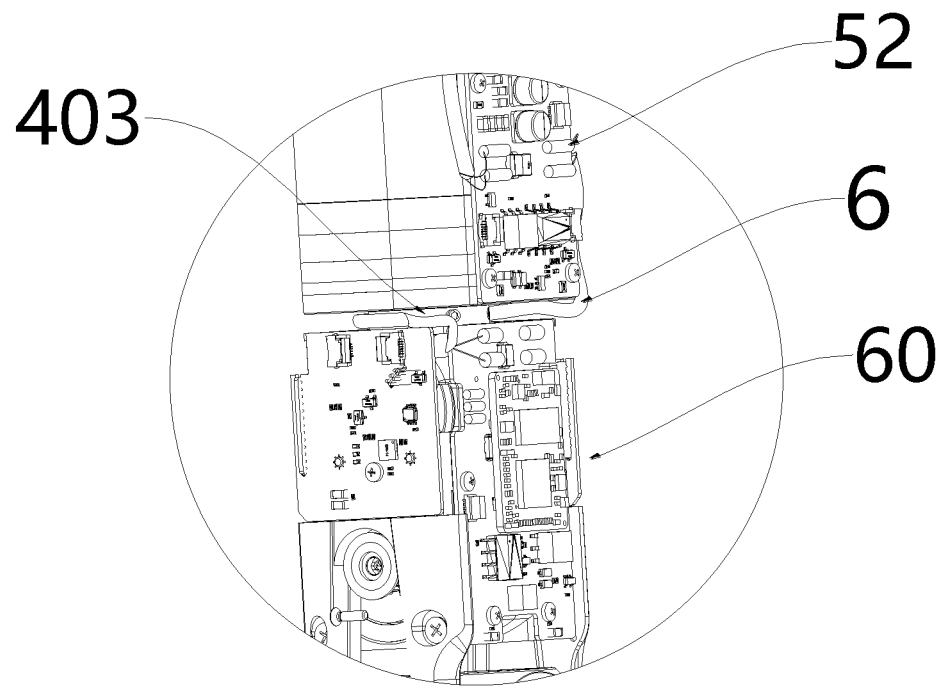
FIG. 14 is a schematic enlarged view of part J in FIG. 12.

As illustrated in FIG. 1, FIG. 9, FIG. 1, and FIG. 14, an upper end of the sixth cable 6 is connected to an electrical signal output port of the forearm effector 50, and the other end of the sixth cable 6 is wound on a rotating shaft 403 between the forearm effector 50 and the wrist effector 60 and disposed in the gap therebetween, and is connected to an electrical signal input port on the elbow effector 60.

Based on this, when the wrist effector 60 rotates relative to the forearm effector 50, the sixth cable 6 is capable of rotating with the rotation of the rotating shaft 403 between the forearm effector 50 and the wrist effector 60. In addition, since one part of the fourth cable 6 is disposed in the gap therebetween, and the other part is disposed proximally to the wrist effector 60 and the forearm effector 50 respectively, the case of the robot may not be pressed outwards. In addition, by reasonably arranging a cable margin of the sixth cable 6 disposed in the gap as described above, it is ensured that when the forearm effector 50 rotates relative to the wrist effector 60, or the forearm effector 50 and the wrist effector 60 rotate relative to the elbow shoulder effector 40, the effector may not pull the sixth cable 6.

In addition, in the present application, the robot further includes an end effector, for example, a hand portion 70 as illustrated in FIG. 1.

The hand portion 70 is rotatably connected to the lower end of the wrist effector 60, and the wrist effector 60 may energize the hand portion 70 and transmit a control signal to the hand portion 70 by a seventh cable (not illustrated in the drawings).

In the present application, PCN control boards may be disposed in the above effectors, and two ends of the cables may be respectively electrically connected to the corresponding PCB control boards in the corresponding controllers.

Exemplary embodiments of the present application are described in detail with reference to the accompanying drawings. However, the present application is not limited to the details in the above embodiments. Within the technical concept of the present application, various ready and simple variations may be made to the technical solution of the present application. These simple variations shall all fall within the protection scope of the present application.

In addition, it should be noted that various specific technical features described in the embodiments, in case of no contradiction, may be combined in any suitable fashion. For brevity of description, possible combinations of the features are not described herein any further.

Further, various embodiments of the present application may be randomly combined as long as the combinations do not go beyond the essence of the present application, and such combinations shall all be considered as the content disclosed by the present application.

What is claimed is:

1. A robot, comprising a robot torso, a robot arm, a main controller, and a plurality of bundles of cables; wherein a plurality of shoulder effectors are configured to drive the robot arm to move are disposed on the robot torso, a plurality of arm effectors that are relatively movable and connected are disposed in sequence on the robot arm, and the main controller is disposed on the robot torso and configured to control a corresponding effector to operate, such that the robot arm has a plurality of degrees of freedom; any adjacent two of the main controller, the plurality of shoulder effectors, and the plurality of arm effectors are electrically connected by a cable bundle, each of the plurality of bundles of cables is disposed on an outer surface of the plurality of shoulder effectors or the plurality of arm effectors which the bundle of cables travels through, and/or each of the plurality of bundles of cables passes through the plurality of shoulder effectors or the plurality of arm effectors which the bundle of cables travels through, and/or each of the plurality of bundles of cables passes through a first gap between the plurality of shoulder effectors which the bundle of cables travels through or a second gap between the plurality of arm effectors which the bundle of cables travels through or a third gap between the plurality of shoulder effectors and the plurality of arm effectors which the bundle of cables travels through;

wherein the plurality of shoulder effectors comprises a first shoulder effector and a second shoulder effector, and the plurality of arm effectors comprises a boom effector, the first shoulder effector is disposed between the main controller and the second shoulder effector, one end of the second shoulder effector is connected to the boom effector to drive the boom effector to move, the first shoulder effector is connected to the other end of the second shoulder effector to drive the second shoulder effector to move, the plurality of bundles of cables comprise a second cable and a third cable, the second cable being electrically connected to the first shoulder effector and the second shoulder effector, the third cable being electrically connected to the second shoulder effector and the boom effector, wherein the first shoulder effector is configured to drive the second shoulder effector to rotate forwards and backwards to drive the robot arm to move forwards and backwards; and one end of the second cable is connected to an electrical signal output port on a rear side of the first shoulder effector, and the other end of the second cable is electrically connected to an electrical signal input port at a front-side upper position of the second shoulder effector, the second cable is partially wound on a rotating shaft between the first shoulder effector and the second shoulder effector and disposed in the first gap therebetween in such a way that the other end of the second cable is wound from the top, via the front side, and to the bottom of the rotating shaft, wherein the second shoulder effector is connected to an upper end of the boom effector to drive the boom effector to rotate leftwards and rightwards;

the boom effector comprises a boom effector body and a pair of first connecting plates fixedly connected to an upper end of the boom effector body and configured to be connected to the second shoulder effector, upper ends of the pair of first connecting plates being rotatably connected to front and rear sides of the second shoulder effector, and each lower end of the pair of first connecting plates being provided with a first wiring holes; and one end of the third cable is connected to an electrical signal output port at a rear-side lower position of the second shoulder effector, and the other end of the third cable is configured to extend upwards and bypasses over the second cable, extend along a rear-side outer surface of the first shoulder effector and pass through a second wire through hole disposed on an end portion of the second shoulder effector, extend between the pair of first connecting plates, then pass from interior of the pair of first connecting plates to exterior of the pair of first connecting plates through the first wiring hole on the first connecting plate on a front side, and finally extend along an outer surface of the boom effector body and is connected to an electrical signal input port on the boom effector body.

2. The robot according to claim 1, wherein the plurality of arm effectors further comprises an elbow effector, a forearm effector, and a wrist effector that are connected in sequence, and the elbow effector is connected to the boom effector, the boom effector, the elbow effector, the forearm effector, and the wrist effector constituting the robot arm;

and an upper effector in the plurality of arm effectors is capable of driving a lower effector that is adjacent to the upper effector to move; and the plurality of bundles of cables further comprise a first cable, a fourth cable, a fifth cable, and a sixth cable, the first cable being electrically connected to the main controller and the first shoulder effector, the fourth cable being electrically connected to the boom effector and the elbow effector, the fifth cable being electrically connected to the elbow effector and the forearm effector, and the sixth cable being electrically connected to the forearm effector and the wrist effector, such that the main controller is capable of controlling the corresponding effector to operate.

3. The robot according to claim 2, wherein the main controller is disposed on a back of the robot torso, one end of the first cable is connected to an electrical signal output port of the main controller, and the other end of the first cable passes through the first gap defined between a left first shoulder effector and a right first shoulder effector on the robot torso and is connected to an electrical signal input port on a front side of the first shoulder effector.

4. The robot according to claim 1, wherein the second shoulder effector comprises a shoulder effector rear end cover disposed on a rear side thereof, the shoulder effector rear end cover comprising a shoulder effector end cover body plate and a first annular flange defined on the shoulder effector end cover body plate, an outer surface of the shoulder effector end cover body plate being provided with a wiring groove extending along a lengthwise direction thereof, the wiring groove extending to the interior of the first annular flange, and a side on a side wall of the first annular flange opposite to the wiring groove being provided with the second wire through hole; and the other end of the third cable is configured to extend in the wiring groove and enter the interior of the first annular flange, and is then led out from the second wire through hole to a position between the pair of first connecting plates.

5. The robot according to claim 1, wherein the first wiring hole is an elongated hole disposed along a widthwise direction of the first connecting plate.

6. The robot according to claim 2, wherein a lower end of the boom effector is connected to an upper end of the elbow effector to drive the elbow effector to rotate about an axial line of the boom effector; and an upper end of the fourth cable is connected to an electrical signal output port of the boom effector, and the other end of the fourth cable is wound on a rotating shaft between the boom effector and the elbow effector and disposed in the second gap therebetween, and is connected to an electrical signal input port of the elbow effector.

7. The robot according to claim 2, wherein a lower end of the elbow effector is connected to an upper end of the forearm effector to drive the forearm effector to move upwards and downwards;

wherein the forearm effector comprises a forearm effector body and a pair of second connecting plates fixedly connected to an upper end of the forearm effector body and configured to be connected to the elbow effector, upper ends of the pair of second connecting plates being rotatably connected to two opposing sides of the elbow effector, and each lower end of the pair of second connecting plates being provided with a third wiring hole;

and one end of the fifth cable is connected to an electrical signal output port of the elbow effector; and the other end of the fifth cable is configured to extend downwards along an outer surface of the elbow effector and pass through a fourth wire through hole disposed on an end portion of the elbow effector, then pass from interior to exterior through a fifth wiring hole at an upper end of one second connecting plate, extend downwards along an outer surface of the second connecting plate, pass from exterior to interior through the third wiring hole disposed at a lower end of the second connecting plate, extend between the pair of second connecting plates, and finally pass from interior to exterior through the third wiring hole on the other second connecting plate, extend along an outer surface of the forearm effector body and is then connected to an electrical signal input port on the forearm effector body.

8. The robot according to claim 6, wherein the elbow effector comprises an elbow effector end cover disposed on a rear side thereof, the elbow effector end cover comprising an elbow effector end cover body plate and a second annular flange defined on the elbow effector end cover body plate, an interior of the second annular flange being in communication with the fifth wiring hole on the one second connecting plate, and the fourth wire through hole being disposed at a lower part of a side wall of the second annular flange; and the other end of the fifth cable is configured to extend along an outer surface of the elbow effector end cover and is partially wound on an outer side of the second annular flange, then configured to enter the interior of the second annular flange from the fourth wiring hole, and is finally led out from interior to exterior from the fifth wiring hole.

9. The robot according to claim 6, wherein the third wiring hole is an elongated hole disposed along a widthwise direction of the second connecting plate.

10. The robot according to claim 2, wherein a lower end of the forearm effector is connected to an upper end of the wrist effector to drive the wrist effector to rotate about an axial line of the forearm effector; and an upper end of the sixth cable is connected to an electrical signal output port of the forearm effector, and the other end of the sixth cable is wound on a rotating shaft between the forearm effector and the wrist effector and disposed in the second gap therebetween, and is connected to an electrical signal input port on the wrist effector.

11. A robot, comprising a robot torso, a robot arm, a main controller, and a plurality of bundles of cables; wherein a plurality of shoulder effectors are configured to drive the robot arm to move are disposed on the robot torso, a plurality of arm effectors that are relatively movable and connected are disposed in sequence on the robot arm, and the main controller is disposed on the robot torso and configured to control a corresponding effector to operate, such that the robot arm has a plurality of degrees of freedom; any adjacent two of the main controller, the plurality of shoulder effectors, and the plurality of arm effectors are electrically connected by a cable bundle, each of the plurality of bundles of cables is disposed on an outer surface of the plurality of shoulder effectors or the plurality of arm effectors which the bundle of cables travels through, and/or each of the plurality of bundles of cables passes through the plurality of shoulder effectors or the plurality of arm effectors which the bundle of cables travels through, and/or each of the plurality of bundles of cables passes through a first gap between the plurality of shoulder effectors which the bundle of cables travels through or a second gap between the plurality of arm effectors which the bundle of cables travels through or a third gap between the plurality of shoulder effectors and the plurality of arm effectors which the bundle of cables travels through;

wherein the plurality of shoulder effectors comprises a first shoulder effector and a second shoulder effector, and the plurality of arm effectors comprises a boom effector, an elbow effector, a forearm effector, and a wrist effector that are connected in sequence, the boom effector, the elbow effector, the forearm effector, and the wrist effector constituting the robot arm;

the first shoulder effector is disposed between the main controller and the second shoulder effector, one end of the second shoulder effector is connected to the boom effector to drive the boom effector to move, the first shoulder effector is connected to the other end of the second shoulder effector to drive the second shoulder effector to move, and an upper effector in the plurality of arm effectors is capable of driving a lower effector that is adjacent to the upper effector to move; and the plurality of bundles of cables comprise a first cable, a second cable, a third cable, a fourth cable, a fifth cable, and a sixth cable, the first cable being electrically connected to the main controller and the first shoulder effector, the second cable being electrically connected to the first shoulder effector and the second shoulder effector, the third cable being electrically connected to the second shoulder effector and the boom effector, the fourth cable being electrically connected to the boom effector and the elbow effector, the fifth cable being electrically connected to the elbow effector and the forearm effector, and the sixth cable being electrically connected to the forearm effector and the wrist effector, such that the main controller is capable of controlling the corresponding effector to operate.

12. The robot according to claim 11, wherein the main controller is disposed on a back of the robot torso, one end of the first cable is connected to an electrical signal output port of the main controller, and the other end of the first cable passes through the first gap defined between a left first shoulder effector and a right first shoulder effector on the robot torso and is connected to an electrical signal input port on a front side of the first shoulder effector.

13. The robot according to claim 11, wherein the first shoulder effector is configured to drive the second shoulder effector to rotate forwards and backwards to drive the robot arm to move forwards and backwards; and one end of the second cable is connected to an electrical signal output port on a rear side of the first shoulder effector, and the other end of the second cable is electrically connected to an electrical signal input port at a front-side upper position of the second shoulder effector, the second cable is partially wound on a rotating shaft between the first shoulder effector and the second shoulder effector and disposed in the first gap therebetween in such a way that the other end of the second cable is wound from the top, via the front side, and to the bottom of the rotating shaft.

14. The robot according to claim 11, wherein a lower end of the boom effector is connected to an upper end of the elbow effector to drive the elbow effector to rotate about an axial line of the boom effector; and an upper end of the fourth cable is connected to an electrical signal output port of the boom effector, and the other end of the fourth cable is wound on a rotating shaft between the boom effector and the elbow effector and disposed in the second gap therebetween, and is connected to an electrical signal input port of the elbow effector.

15. The robot according to claim 11, wherein a lower end of the elbow effector is connected to an upper end of the forearm effector to drive the forearm effector to move upwards and downwards;

wherein the forearm effector comprises a forearm effector body and a pair of second connecting plates fixedly connected to an upper end of the forearm effector body and configured to be connected to the elbow effector, upper ends of the pair of second connecting plates being rotatably connected to two opposing sides of the elbow effector, and each lower end of the pair of second connecting plates being provided with a third wiring hole;

and one end of the fifth cable is connected to an electrical signal output port of the elbow effector, and the other end of the fifth cable is configured to extend downwards along an outer surface of the elbow effector and pass through a fourth wire through hole disposed on an end portion of the elbow effector, then pass from interior to exterior through a fifth wiring hole at an upper end of one second connecting plate, extend downwards along an outer surface of the second connecting plate, pass from exterior to interior through the third wiring hole disposed at a lower end of the second connecting plate, extend between the pair of second connecting plates, and finally pass from interior to exterior through the third wiring hole on the other second connecting plate, extend along an outer surface of the forearm effector body and is then connected to an electrical signal input port on the forearm effector body.

16. The robot according to claim 15, wherein the elbow effector comprises an elbow effector end cover disposed on a rear side thereof, the elbow effector end cover comprising an elbow effector end cover body plate and a second annular flange defined on the elbow effector end cover body plate, an interior of the second annular flange being in communication with the fifth wiring hole on the one second connecting plate, and the fourth wire through hole being disposed at a lower part of a side wall of the second annular flange; and the other end of the fifth cable is configured to extend along an outer surface of the elbow effector end cover and is partially wound on an outer side of the second annular flange, then configured to enter the interior of the second annular flange from the fourth wiring hole, and is finally led out from interior to exterior from the fifth wiring hole.

17. The robot according to claim 15, wherein the third wiring hole is an elongated hole disposed along a widthwise direction of the second connecting plate.

18. The robot according to claim 11, wherein a lower end of the forearm effector is connected to an upper end of the wrist effector to drive the wrist effector to rotate about an axial line of the forearm effector; and an upper end of the sixth cable is connected to an electrical signal output port of the forearm effector, and the other end of the sixth cable is wound on a rotating shaft between the forearm effector and the wrist effector and disposed in the second gap therebetween, and is connected to an electrical signal input port on the wrist effector.

\* \* \* \* \*